United States Patent
Nagae

(10) Patent No.: US 7,021,776 B2
(45) Date of Patent: Apr. 4, 2006

(54) SPACE NAVIGATION OPTICAL INSTRUMENT AND CONTAMINANT REMOVING METHOD THEREOF

(75) Inventor: Kazuhiro Nagae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/164,635

(22) Filed: Jun. 10, 2002

(65) Prior Publication Data

US 2003/0112512 A1 Jun. 19, 2003

(30) Foreign Application Priority Data

Dec. 17, 2001 (JP) .............................. 2001-383300

(51) Int. Cl.
*G02B 23/00* (2006.01)

(52) U.S. Cl. ...................... 359/507; 359/896; 359/820; 244/163

(58) Field of Classification Search ................ 359/507, 359/399, 512, 503, 808, 809, 508, 820; 244/158 R; D12/320
See application file for complete search history.

(56) References Cited

U.S. PATENT DOCUMENTS

| 5,191,469 A | * | 3/1993 | Margolis ..................... 359/366 |
| 5,296,285 A | * | 3/1994 | Babel et al. ................. 428/213 |
| 5,696,429 A | * | 12/1997 | Williamson et al. .... 315/111.51 |
| 5,716,030 A | * | 2/1998 | LaFiandra et al. ....... 244/158 R |

FOREIGN PATENT DOCUMENTS

| JP | 2-140517 | 11/1990 |
| JP | 3-67312 | 7/1991 |
| JP | 2688322 | 8/1997 |

* cited by examiner

*Primary Examiner*—Drew A. Dunn
*Assistant Examiner*—Mark Consilvio
(74) *Attorney, Agent, or Firm*—Oblon, Spivak, McClelland, Maier & Neustadt, P.C.

(57) ABSTRACT

In a space navigation optical instrument comprising a barrel for housing therein an optical part and a contaminant removing door, provided at a part of the outer periphery of the barrel which has the largest radiant heat coupled to the space during a space navigation and has the least external heat input, for opening the inside of the barrel to the space, a thermal gradient is generated in which the inside of the barrel is of a high temperature and the space is of a low temperature, and the inside of the barrel is opened to the space by opening the contaminant removing door to discharge contaminants into the space.

34 Claims, 6 Drawing Sheets

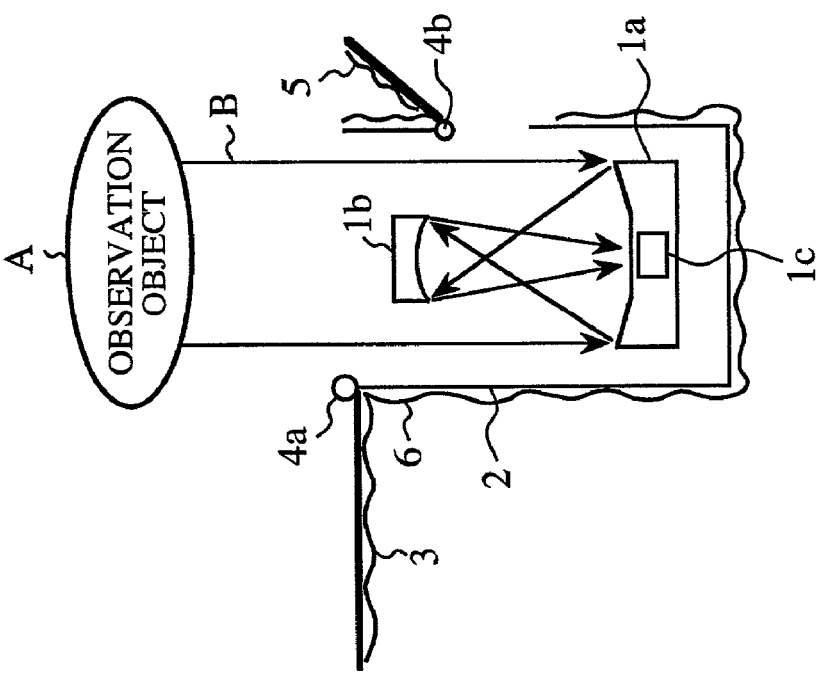
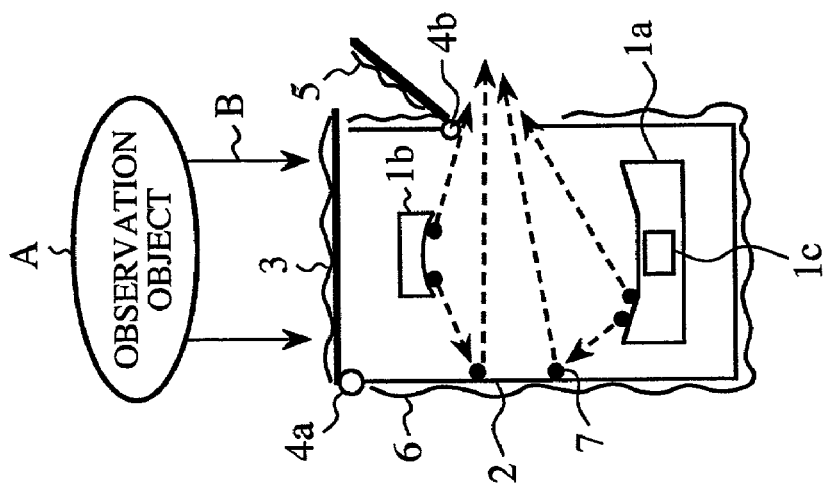
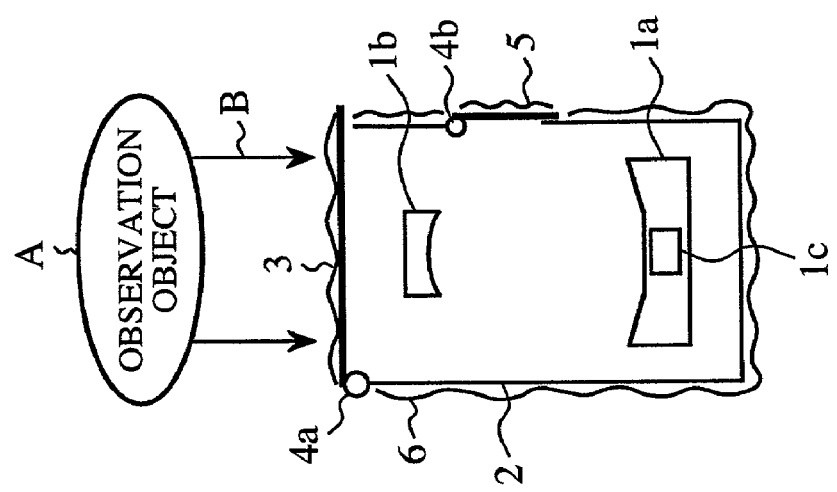

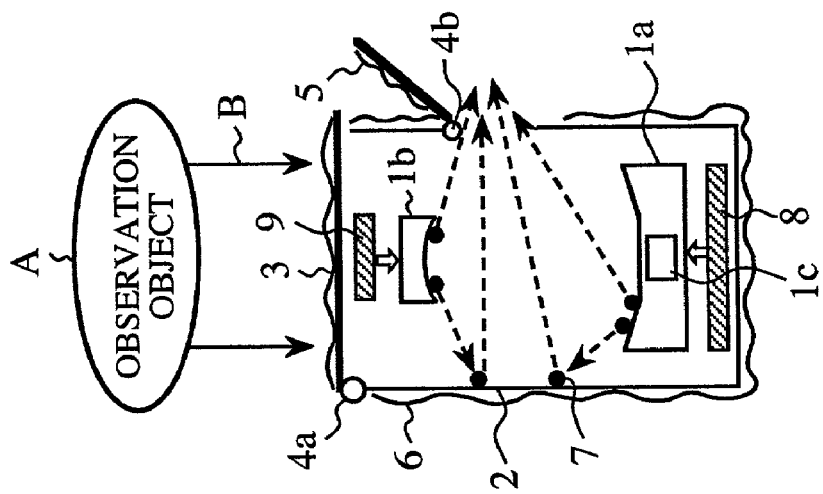
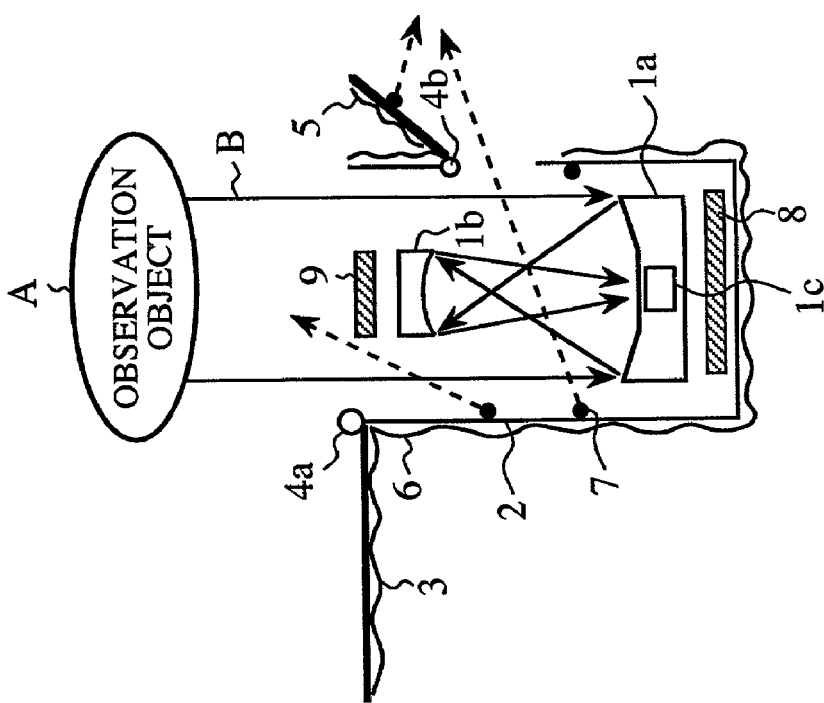
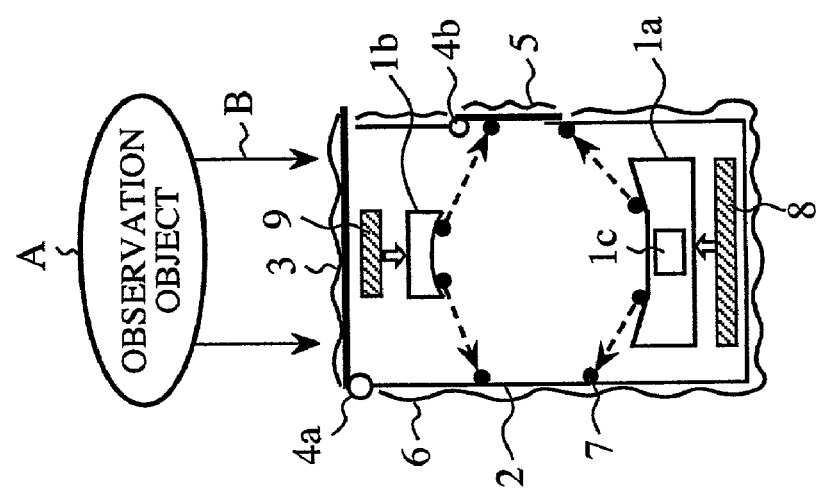

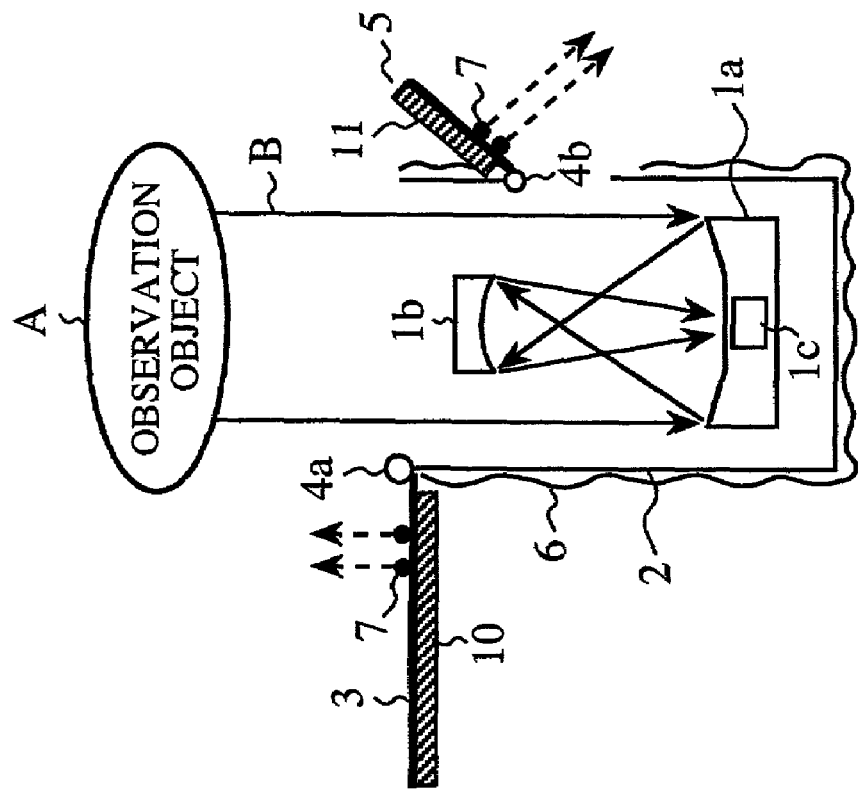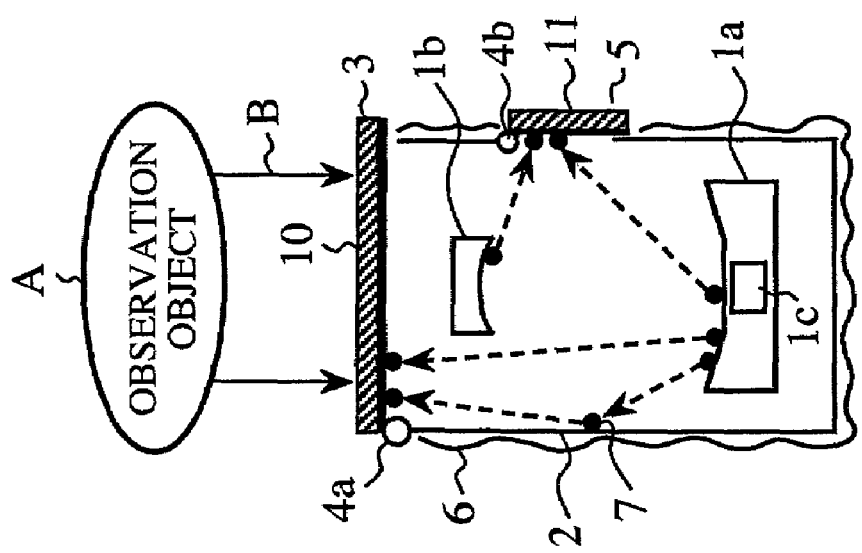

1

SPACE NAVIGATION OPTICAL INSTRUMENT AND CONTAMINANT REMOVING METHOD THEREOF

BACKGROUND OF THE INVENTION

1. Field of the Invention

The present invention relates to a space navigation optical instrument such as a space telescope mounted on an artificial satellite and, in particular, to a space navigation optical instrument in which a housing constituting an optical instrument is provided with a mechanism for discharging contaminants into the space and a contaminant removing method thereof.

2. Description of the Related Art

FIG. 6 is a cross sectional view showing a schematic structure of a space telescope as a conventional space navigation optical instrument. FIG. 6A shows the state where the space telescope is in advance of observations and FIG. 6B the state where the space telescope is in the process of observations in orbit. The space telescope is mounted on an artificial satellite going around the earth in a predetermined orbit.

Referring to FIGS. 6A, 6B, reference numerals 100a to 100c denote optical parts constructing the space telescope, which in the example shown in FIGS. 6A, 6B, constructs a reflecting optical system for receiving observed light B emitted from an observation object A. A reference numeral 101 denotes a lens barrel for housing therein the optical parts 100a to 100c, which protects the optical parts 110a to 100c from severe space environments such as heat, contaminants (for example, volatile substances and moisture generated in a vacuum environment from a CFRP structure (carbon fiber reinforced plastics) provided in the lens barrel 101, an organic material and the like) and radioactive rays. A reference numeral 102 denotes a top door mounted on an observation aperture (entrance pupil) for guiding the observed light B emitted from the observation object A to the optical parts 100a to 100c, which is supported by the lens barrel 101 by means of a hinge 103. The top door 102 is turned around the hinge 103 to allow the door 102 to be opened or closed. Further, a reference numeral 104 denotes a heat insulating material covering the lens barrel 101, which is a heat insulating material for the space called MLI (multi-layer insulation).

Next, the operation of the conventional space telescope will be described.

When the satellite mounted with the space telescope is launched and succeeded in going in a predetermined orbit, first, as shown in FIG. 6A, an optical axis of the optical system constructing the optical parts 100a to 100c of the space telescope is directed toward an optical axis of the observed light B emitted from the observation object A. Then, as shown in FIG. 6B, the top door 102 is opened to receive the observed light B by the optical parts 100a to 100c with started observations.

Here, for example, in the space telescope which receives light having a wavelength within a visible light range as the observed light B, the amount of heat absorbed by the mirror surface of the optical part of the reflecting optical system is determined by sunlight absorptivity (hereinafter referred to as "α value"). Variations in the amount of heat of absorption affects even the optical characteristics of a reflecting mirror. Thus, whether or not the space telescope satisfies performance requirements when it is operated in orbit depends on how degradation of the α value (increase in the α value) can be held down.

2

The degradation of the α value measured on the mirror surface of the optical part is caused mainly by adhesion of contaminants thereto. Further, when ultraviolet rays are irradiated on the mirror surface to which contaminants are being adhered, there may be the possibility that organic substances contained in the contaminants would be decomposed and blacked, bringing about a fatal malfunction in an optical telescope.

To eliminate such unfavorable malfunction, as control of the contaminants adhered to the mirror surface of the optical part, it is essential to quantitatively evaluate the control of the contaminants in every processes of manufacturing, assembling, testing and launching on the ground prior to launching an artificial satellite. Similarly, at the time of observations in orbit, it is vital to quantitatively evaluate the control of the contaminants.

The conventional space navigation optical instrument thus constructed as above precludes removal of the contaminants adhered to the mirror surface of the control part once the space navigation optical instrument is launched in space. This disable one from being coped with a malfunction caused by the contaminants.

Specifically, it can actually attend with very difficulties in quantitatively evaluating the control of the contaminants before the satellite is launched. For example, it precludes evaluation of the contaminants which are not generated under the atmospheric pressure but are vaporized when they are put in space under an ultra high vacuum. Further, in the first place, various kinds of adsorptive molecules such as water and the like are adhered to the mirror surface of the optical part under the atmospheric pressure, assuming a condition of the mirror surface significantly different from that in space.

On the other hand, it holds true as with predicting how many contaminants will be adhered to the mirror surface of the optical part during the period from the time immediately after the launching of the satellite to the time when the space telescope starts the observations in orbit. That is, the conventional space navigation optical instrument lacks means for quantitatively evaluating the amount of contaminant molecules generated in the lens barrel 101 or the amount of contaminants adhered to the mirror surface of the optical part during the period from the time immediately after the launching of the satellite to the time when the space telescope starts the observations in orbit.

Under such circumstances, if a conventional method of operating the space telescope as shown in FIGS. 6A, 6B is employed, the top door 102 comes to open, with the contaminants adhered to the mirror surface of the optical part. As a result, there will be many dangers that the space telescope cannot be made observations, depending on how large the α value degrades as well as the aforementioned malfunction occurs and thus the space telescope can not satisfy the performance requirements in the initial state of the observations.

SUMMARY OF THE INVENTION

The present invention has been made to solve the above problems and in consideration of the fact that it is infeasible, as described above, to quantitatively evaluate the amount of contaminants adhered to the mirror surface of the optical part until immediately before starting observations in orbit around the earth (i.e., it is infeasible to control the amount of contaminants).

An object of the present invention is to provide a space navigation optical instrument capable of removing the contaminants adhered to the mirror surface of the optical part just before starting the observations of the space navigation optical instrument (i.e., just before light impinges on the mirror surface) by providing a lens barrel for housing therein the optical part with a mechanism for discharging the contaminants into the space.

Another object of the present invention is to provide contaminant removing method capable of efficiently removing the contaminants from the space navigation optical instrument.

A space navigation optical instrument according to the present invention includes a barrel for housing therein an optical part; and a contaminant removing door, provided at a part of the outer periphery of the barrel which has the largest radiant heat rate coupled to the space during a space navigation and has the least external heat input, for opening the inside of the barrel to the space.

A contaminant removing method according to the present invention is a method of removing the contaminant for a space navigation optical instrument including a barrel for housing therein an optical part and a contaminant removing door, provided at a part of the outer periphery of the barrel which has the largest radiant heat rate coupled to the space during a space navigation and has the least external heat input, for opening the inside of the barrel to the space, and the method includes the steps of generating a thermal gradient between the inside of the barrel of a high temperature and the space of a low temperature; and opening the inside of the barrel to the space by opening the contaminant removing door to discharge the contaminant into the space.

BRIEF DESCRIPTION OF THE DRAWINGS

FIG. 1 is a cross sectional view showing the schematic structure of a space navigation optical instrument according to a first embodiment of the present invention.

FIG. 2 is a cross sectional view showing the schematic structure of a space navigation optical instrument according to a second embodiment of the present invention.

FIG. 3 is a cross sectional view showing the schematic structure of a space navigation optical instrument according to a third embodiment of the present invention.

DESCRIPTION OF THE PREFERRED EMBODIMENTS

Figure 4A:
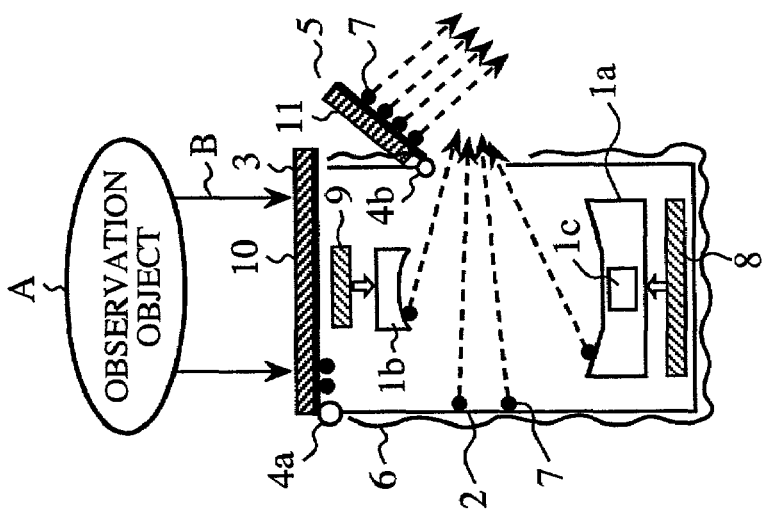
FIG. 4 is a cross sectional view showing the schematic structure of a space navigation optical instrument according to a fourth embodiment of the present invention.

Hereinafter, the preferred embodiments of the present invention will be described in detail with reference to the attached drawings.

FIRST EMBODIMENT

FIG. 1 is a cross sectional view showing the schematic structure of a space navigation optical instrument according to the first embodiment of the present invention. FIG. 1A shows the state of the space navigation optical instrument in advance of observations in orbit, FIG. 1B schematically shows the behavior of contaminants in the state of FIG. 1A, and FIG. 1C shows the state of the space navigation optical instrument in the course of observations in orbit. Further, in FIGS. 1A to 1C, a space telescope is taken as an example of the space navigation optical instrument.

Referring to FIGS. 1A to 1C, reference numerals $1a$ to $1c$ denote optical parts constructing the optical system of the space telescope and, in the example shown in FIGS. 1A to 1C, the optical parts $1a$ to $1c$ construct a reflecting optical system for receiving observed light B emitted from an observation object A. A reference numeral 2 denotes a lens barrel (box) for housing therein the optical parts $1a$ to $1c$ and the lens barrel 2 protects the inner optical parts $1a$ to $1c$ from the severe space environment such as heat, contaminants 7 and radioactive rays. A reference numeral 3 denotes a top door (observation system side door) provided on an observation aperture (entrance pupil) for guiding the observed light B emitted from the observation object A to the optical parts $1a$ to $1c$, which is supported by the lens barrel 2 through a hinge $4a$ to protect the inside of the lens barrel 2 from the external environment. The top door 3 is turned around the hinge $4a$ to allow the door 3 to be freely opened or closed.

Further, a reference numeral 5 denotes a side door (door for removing the contaminants) provided on an aperture at a portion of the outer surface of the lens barrel 2, which has the largest radiant heat rate coupled to the space (about 3K or so) and has the least external heat input in orbit from the outside so as to cover the aperture. The side door 5 is supported by the lens barrel 2 through the hinge $4b$ and is turned around the hinge $4b$ to permit the door 5 to be freely opened or closed. A reference numeral 6 denotes a heat insulating material (thermal gradient generating means) for covering the lens barrel 2, which is realized by a heat insulating material for the space called MLI (multi layer insulation) or the like. A reference numeral 7 denotes contaminants generated in the lens barrel 2 and includes volatile substances and moisture generated from a CFRP structure (carbon fiber reinforced plastics) and an organic material.

Next, the operation of the first embodiment will be described.

In advance of the observations in orbit, as shown in FIG. 1A, the optical axis of the optical system constructing the optical parts $1a$ to $1c$ of the space telescope is directed toward the optical axis of the observed light B emitted from the observation object A. However, the top door 3 is still closed and thus the mirror surfaces of the optical parts is not ready for receiving of the observed light B. At this time, the contaminants are adhered to the inside wall of the lens barrel 2, and the mirror surfaces of the optical parts and contaminant molecules are floating also in the gas in the lens barrel 2. Collisions of these contaminant molecules floating in the gas with the inside wall of the lens barrel 2 and the mirror surfaces of the optical parts spurs the contaminants to be adhered to the inside wall and the mirror surfaces of the optical parts.

To avoid the above disadvantage, in the first embodiment, before the top door 3 is opened and the mirror surfaces of the optical parts receive the observed light B, as shown in FIG. 1B, only the side door 5 is opened. This operation leads the inside of the lens barrel 2 inclusive of the optical parts $1a$ to $1c$ to spatial and thermal coupling of the cryogenic space (about 3 K or so) at a given angle of view via the aperture of the side door 5. The outside periphery of the lens barrel 2 is thermally separated from the cryogenic space by the heat insulating material 6 to keep the inside of the barrel 2 in a high temperature than a cryogenic temperature. For this reason, when only the side door 5 is opened, a temperature difference (thermal gradient) is generated between the inside of the lens barrel 2 and the space by the presence of the aperture of the side door 5.

Here, it has been known that the contaminants 7 (e.g., volatile substances generated from the moisture and the organic material) migrate (float) in the shape of a hemisphere from a high temperature part to a low temperature part under vacuum. In consideration for such behavior of the contaminants 7, actualizing the state shown in FIG. 1B becomes possible to discharge the contaminants 7 adhered to the inside of the space telescope, especially, to the mirror surfaces of the optical parts into the space (see arrows indicated by the broken lines in FIG. 1B).

After the state shown in FIG. 1B is kept for a plenty of time for the space telescope, as shown in FIG. 1C, the top door 3 is opened, the optical parts 1a to 1c receive the observed light B to start the observations.

As mentioned above, according to the first embodiment, the space navigation optical instrument is provided with the lens barrel 2 for housing therein the optical parts 1a to 1c and the side door 5 provided at the portion of the outer surface of the lens barrel 2, which has the largest radiant heat rate coupled to the space during the space navigation and has the least heat input from the outside in the whole surface of the lens barrel 2, so as to open the inside of the lens barrel 2 to the space. This discharges the contaminants adhered to the inside of the lens barrel 2 and the mirror surface of the optical parts into the space.

SECOND EMBODIMENT

FIG. 2 is a cross sectional view showing the schematic structure of a space navigation optical instrument according to the second embodiment of the present invention. FIG. 2A shows the state of the space navigation optical instrument in advance of the observations in orbit, FIG. 2B shows the state of the space navigation optical instrument in the process of observations in orbit, and FIG. 2C shows another state of the space navigation optical instrument in advance of the observations in orbit. In FIGS. 2A to 2C, a space telescope is taken as an example of the space navigation optical instrument.

Referring to FIGS. 2A to 2C, reference numerals 8, 9 denote decontaminating heaters (heating means) provided in the vicinity of the optical parts 1a to 1c, which heat the optical parts 1a to 1c, respectively. The decontaminating heaters 8, 9 may have a structure, for example, in which a flat heating element is attached to the back surface of a reflecting mirror constructing each of the optical parts 1a to 1c. Further, the electric power for the heating element may be supplied by a solar cell. Incidentally, the same components as those in FIGS. 1A to 1C are indicated by the same reference numerals and the description thereof is omitted for brevity's sake.

Next, the operation of the second embodiment will be described.

In advance of the observations, as shown in FIG. 2A, the attitude of the space telescope is directed toward the observation object A. Further, the decontaminating heaters 8, 9 are heated with the top door 3 and the side door 5 closed, respectively, to heat the respective optical parts 1a to 1c for ample time (hereinafter referred to as baking in orbit). In this manner, heating the optical parts 1a to 1c by the decontaminating heaters 8, 9 raises a temperature of the optical parts 1a to 1c higher than the other components (including the lens barrel 2 as well) in the lens barrel 2) to generate a temperature difference (thermal gradient). This separates the contaminants 7 adhered to the optical parts 1a to 1c from the surfaces of the optical parts 1a to 1c (see arrows indicated by the broken lines in FIG. 2A).

After the optical parts are subjected to the baking in orbit for a plenty of time, the contaminants 7 separated from the optical parts 1a to 1c adhere to the inside wall of the lens barrel 2. Subsequently, as shown in FIG. 2B, when the top door 3 and the side door 5 are opened at the same time, the contaminants 7 are discharged into the space through two apertures in the lens barrel 2 (see arrows indicated by the broken lines in FIG. 2B). In this case, opening the top door 3 and the side door 5 attains the higher conductance to the space and good discharge efficiency of the contaminants 7, as compared with the first embodiment described above.

Further, as shown in FIG. 2C, in advance of the observations, the optical parts 1a to 1c may be subjected to the baking in orbit in which the decontaminating heaters 8, 9 are generated heat with the side door 5 opened to heat the optical parts 1a to 1c for a plenty of time. Also, in this case, as is the case described above, heating the optical parts 1a to 1c by the decontaminating heaters 8, 9 separates the contaminants 7 from the optical parts 1a to 1c and opening the side door 5 discharges the contaminants 7 into the space. Here, after the side door 5 is opened, the decontaminating heaters 8, 9 keep heating the optical parts 1a to 1c. After this baking in orbit has done for ample time, the top door 3 is opened to start observations by the use of the space telescope. In this way, opening the side door 5 before starting the baking in orbit makes it possible to efficiently discharge the contaminants in the lens barrel 2 into the space.

As mentioned above, according to the second embodiment, the space navigation optical instrument is provided with the decontaminating heaters 8, 9 for heating the optical parts 1a to 1c. This generates the steeper thermal gradient in which the optical parts 1a to 1c is of a high temperature, thus efficiently discharging the contaminants adhered to the mirror surfaces of the optical parts into the space.

THIRD EMBODIMENT

FIG. 3 is a cross sectional view showing the schematic structure of a space navigation optical instrument according to the third embodiment of the present invention. FIG. 3A shows the state of the space navigation optical instrument in advance of observations in orbit, FIG. 3B shows the state of the space navigation optical instrument in the course of the observations in orbit. In FIGS. 3A, 3B, a space telescope is taken as an example of the space navigation optical instrument.

Referring to FIGS. 3A, 3B, reference numerals 10, 11 denote heat control members (or surface treatment) (heat radiating means) having a small $\alpha/\epsilon$ value and being provided on the outside surfaces (exposed to the space) of the top door 3 and the side door 5, respectively, which serve as heat radiating surfaces by taking themselves as a low-temperature plate. This enables the top door 3 and the side door 5 to function as the plates for trapping the contaminants 7, respectively. Where, $\alpha$ is sunlight absorptivity and $\epsilon$ is infrared emissivity. Then, the heat control members (surface treatment) 10, 11 can be realized, for example, by a silver Teflon (trademark) that is an adhesive tape using an adhesive substance having a small $\alpha/\epsilon$ value, an OSR (optical solar reflector), and a white paint. Incidentally, the same components as those in FIGS. 1A to 1C are indicated by the same reference numerals and the description thereof is omitted for brevity's sake.

Next, the operation of the third embodiment will be described. In the first place, in advance of the observations, as shown in FIG. 3A, the attitude of the space telescope is directed toward the observation object A and the top door 3 and the side door 5 provided with the heat control members 10, 11 having a small $\alpha/\epsilon$ value are closed. At this time, the temperatures of the top door 3 and the side door 5 are fallen several tens degrees, as compared with those of the barrel 2 or the components in the barrel 2 owing to the heat control members 10, 11 having a small $\alpha/\epsilon$ value. In other words, the temperatures of both doors 3, 5 are lower than those of the optical parts 1*a* to 1*c* by several tens degrees. For this reason, the contaminants adhered to the mirror surfaces of the optical parts 1*a* to 1*c* are migrated (floated) to and adsorbed by both doors 3, 5. In this manner, mounting the heat control members 10, 11 having a small $\alpha/\epsilon$ value on the outside surfaces of the top door 3 and the side door 5 makes it possible to have the top door 3 and the side door 5 incorporate a function of adsorbing the contaminants 7, respectively.

In the above manner, the contaminants adhered to the mirror surfaces of the optical parts are absorbed by the top door 3 and the side door 5 as shown in FIG. 3B, and they are opened at the same time. This discharges the contaminants 7 into the space and starts the observations by the space telescope.

As mentioned above, according to the third embodiment, providing the top door 3 and the side door 5 with the heat control members 10, 11 to reduce the top door 3 and the side door 5 to cryogenic plates makes it possible to function the top door 3 and the side door 5 as the traps for the contaminants 7. This efficiently removes the contaminants 7 adhered to the mirror surfaces of the optical parts.

FOURTH EMBODIMENT

Figure 4B:
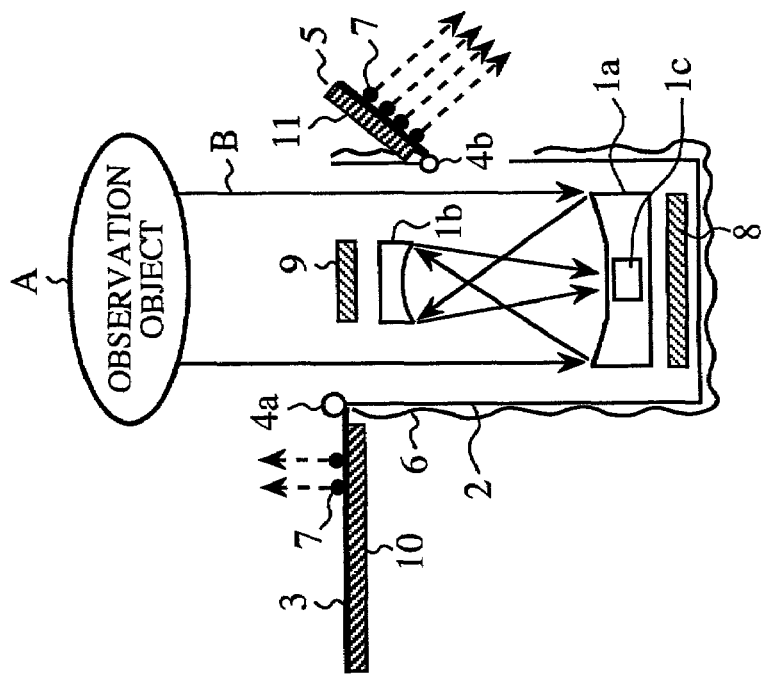
Figure 4C:
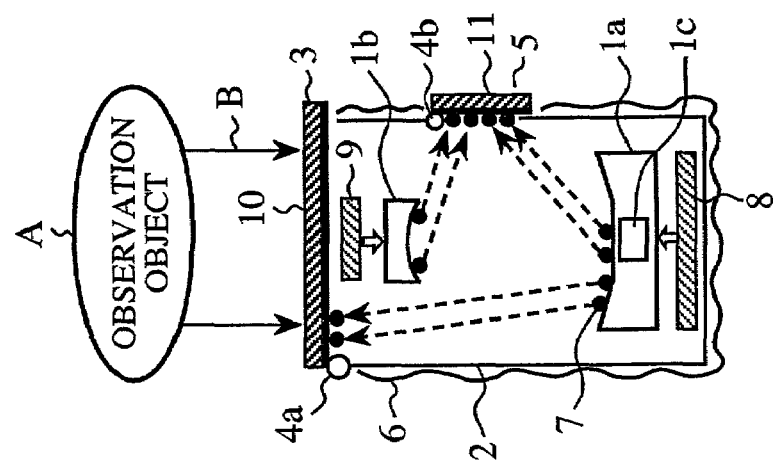

FIG. 4 is a cross sectional view showing the schematic structure of a space navigation optical instrument according to the fourth embodiment of the present invention. FIG. 4A shows the state of the space navigation optical instrument in advance of observations in orbit, FIG. 4B shows the state of the space navigation optical instrument in the process of the observations in orbit, and FIG. 4C shows another state of the space navigation optical instrument in advance of the observations in orbit. In FIGS. 4A to 4C, a space telescope is taken as an example of the space navigation optical instrument. The space navigation optical instrument shown in FIGS. 4A to 4C corresponds to the structure in which the decontaminating heaters 8, 9 are added to that in FIGS. 3A, 3B.

Next, the operation of the fourth embodiment will be described. In the first place, in advance of the observations, as shown in FIG. 4A, the attitude of the space telescope is directed toward the observation object A and the top door 3 and the side door 5 provided with the heat control members 10, 11 having a small $\alpha/\epsilon$ value are closed. Here, the decontaminating heaters 8, 9 are generated heat to heat the optical parts 1*a* to 1*c* (baking in orbit), separating the contaminants 7 adhered to the optical parts 1*a* to 1*c* from their surfaces. At this time, the contaminants 7 separated from the surfaces of the optical parts 1*a* to 1*c* are immediately trapped by the top door 3 and the side door 5 which are reduced to cryogenic plates by the heat control members 10, 11. In this manner, raising the temperatures of the optical parts 1*a* to 1*c* removes the increased amount of the contaminants 7 from the mirror surfaces of the optical parts 1*a* to 1*c* and generating the great temperature difference (thermal gradient) between the optical parts 1*a* to 1*c* and the doors 3, 5 improves adsorptivity of the contaminant 7 for the doors 3, 5, as compared with the above third embodiment.

After the aforementioned baking in orbit has done for a plenty of time, the top door 3 and the side door 5 are opened to discharge the contaminants 7 adhered to the mirror surfaces of the optical parts as shown in FIG. 4B, starting the observations by the space telescope.

Alternatively, in advance of the observations, the baking in orbit may be performed in the following way. First, the attitude of the space telescope is directed toward the observation object A. Then, the decontaminating heaters 8, 9 are generated heat with the top door 3 and the side door 5 closed, respectively, to heat the optical parts 1*a* to 1*c* for ample time. Also, in this case, as is the case described above, heating the optical parts 1*a* to 1*c* by the decontaminating heaters 8, 9 separates the contaminants 7 from the optical parts 1*a* to 1*c* and adsorbs them by the top door 3 and the side door 5 which are reduced to the cryogenic plates. After the baking in orbit has done for ample time, as shown in FIG. 4C, only the side door 5 is opened to discharge the contaminants 7 adhered to the side door 5 and in the lens barrel 2 into the space. Also, even after the side door 5 is opened, the baking in orbit by the decontaminating heaters 8, 9 is done for a plenty of time and the top door 3 is opened to start the observations by the space telescope. In this manner, opening the side door 5 before starting the baking in orbit efficiently discharges the contaminants 7 in the lens barrel into the space.

As mentioned above, according to the fourth embodiment, providing the decontaminating heaters 8, 9 for raising the temperatures of the optical parts 1*a* to 1*c* higher than those of the other components and the heat control members 10, 11 for falling the temperatures of the top door 3 and the side door 5 to reduce it to the cryogenic plates effectively traps the contaminants 7 separated from the mirror surface of the optical parts by the top door 3 and the side door 5. This efficiently removes the contaminants 7 adhered to the mirror surfaces of the optical parts.

FIFTH EMBODIMENT

Figure 5B:
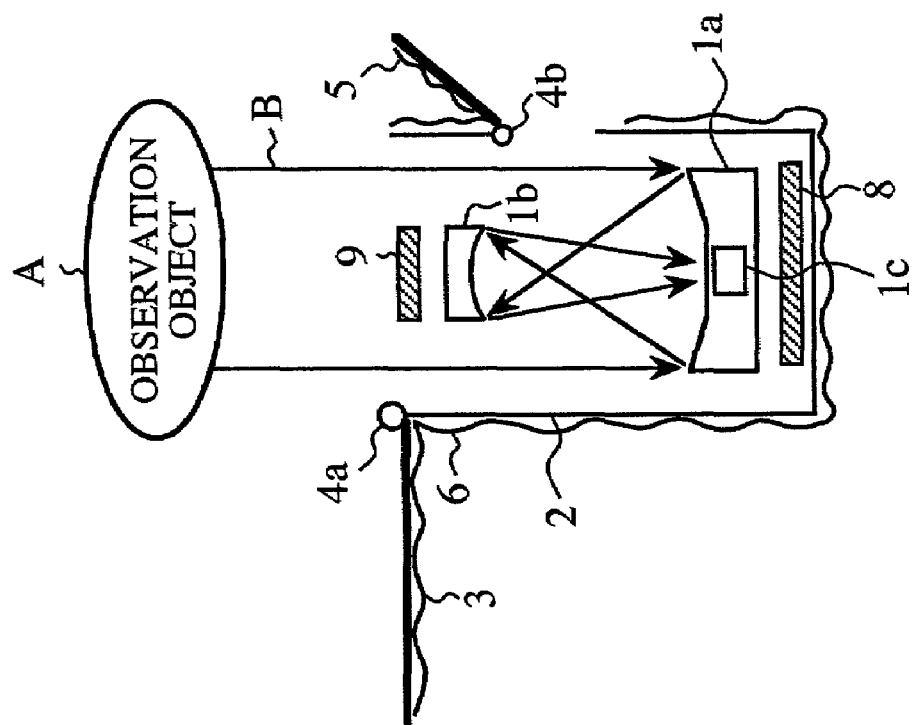
FIG. 5 is a cross sectional view showing the schematic structure of a space navigation optical instrument according to a fifth embodiment of the present invention.
Figure 5A:
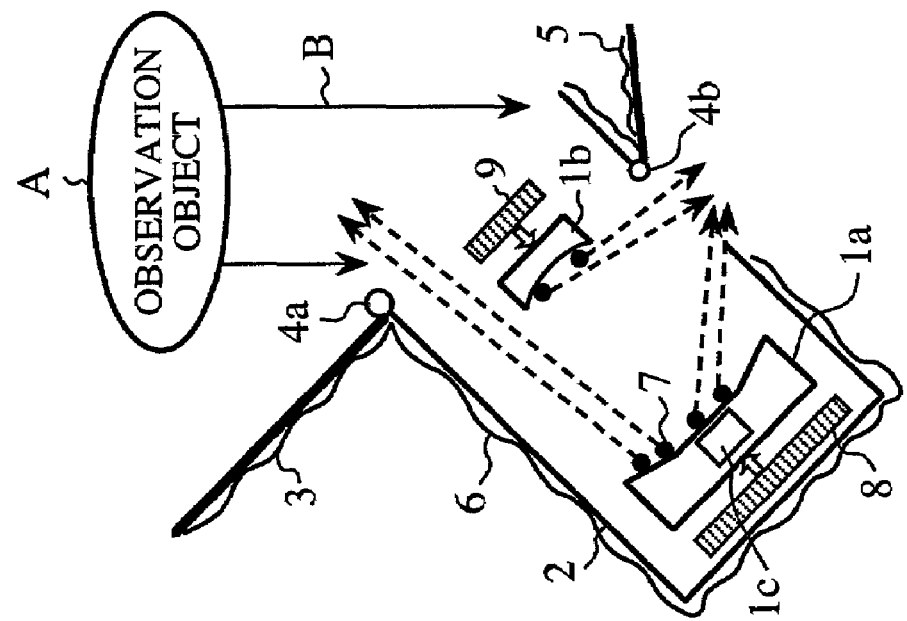
Figure 6A:
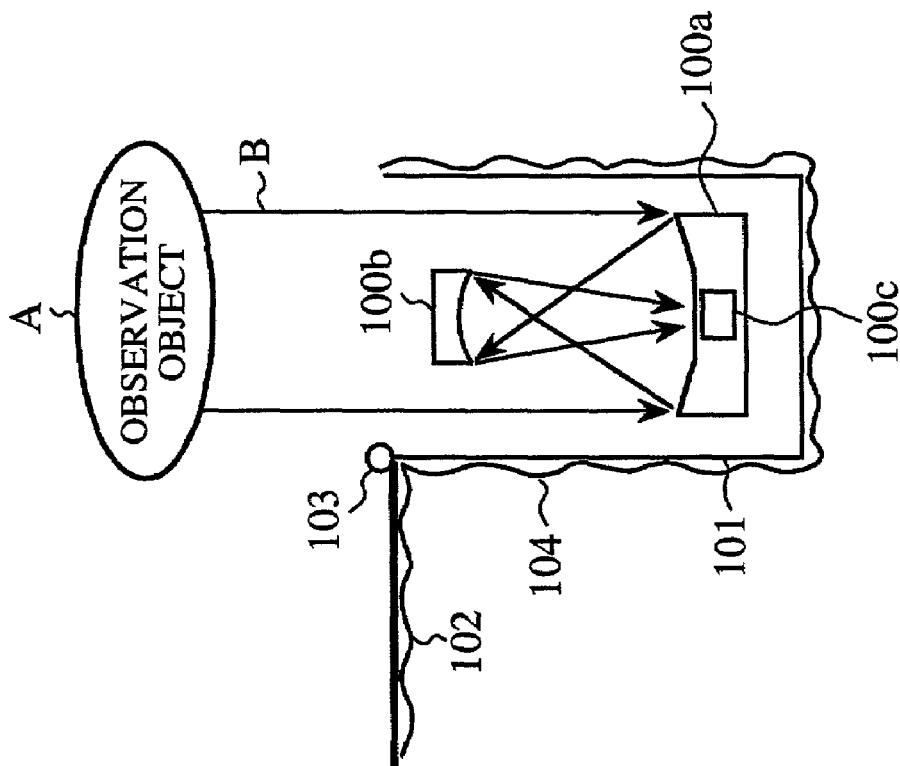
FIG. 6 is a cross sectional view showing the schematic structure of a space telescope as a conventional space navigation optical instrument.
Figure 6B:
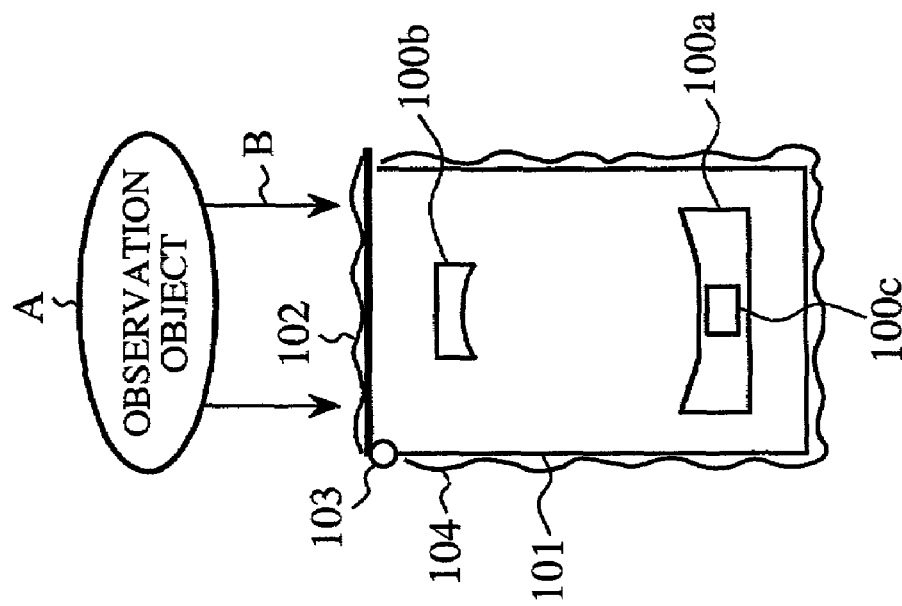

FIG. 5 is a cross sectional view showing the schematic structure of a space navigation optical instrument according to the fifth embodiment of the present invention. FIG. 5A shows the state of the space navigation optical instrument in advance of observations in orbit, FIG. 5B shows the state of the space navigation optical instrument in the course of the observations in orbit. In FIGS. 5A, 5B, a space telescope is taken as an example of the space navigation optical instrument. All the space navigation optical instrument shown in FIGS. 5A, 5B is the same as that shown in FIGS. 2A to 2C. The difference between the fifth embodiment and the aforementioned second embodiment lies in the method of operating the doors 3, 5.

Next, the operation of the fifth embodiment will be described. As shown in FIG. 5A, in advance of the observations, even after the top door 3 is opened, the directional axis (attitude) of the space telescope is controlled so that the optical parts 1*a* to 1*c* do not receive the observed light B. At this time, the optical parts 1*a* to 1*c* do not show heat absorption because they do not receive the observed light B. For this reason, the temperature in the lens barrel 2 falls as compared with that during the observations. The decontaminating heaters 8, 9 are generated heat to heat (baking in orbit) the optical parts 1*a* to 1*c* with this attitude kept, and then the top door 3 and the side door 5 are opened. That is, falling the temperature in the lens barrel 2 in advance of the observations by controlling the attitude of the space telescope as compared with that during the observations generates the steeper thermal gradient in which the optical parts 1a to 1c are of a high temperature. This more reliably removes the contaminants 7 adhered to the optical parts 1a to 1c.

After doing the aforementioned baking in orbit for a plenty of time, as shown in FIG. 5B, the directional axis (attitude) of the space telescope is aligned with the optical axis of the observed light to start the observations by the space telescope.

As mentioned above, according to the fifth embodiment, the optical instrument is controlled to take the attitude in which the observed light B does not impinge when the top door 3 is opened and the inside of the lens barrel 2 is opened to the space by opening the top door 3 and/or the side door 5 while heating the optical parts 1a to 1c, discharging the contaminants 7 into the space. This generates steeper thermal gradient in which the optical parts 1a to 1c are of a high temperature and efficiently discharges the contaminants adhered to the mirror surfaces of the optical parts into the space.

EFFECT OF THE INVENTION

As described above, according to the present invention, since the barrel for housing therein the optical parts is provided with a mechanism for efficiently discharging the contaminants into the space, it is possible to remove the contaminants adhered to the optical parts during the space navigation.

What is claimed is:

1. A space navigation optical instrument comprising: means for housing an optical part; and means for opening and closing an inside of the means for housing to space and including means for radiating heat located on an outer periphery of the means for housing, said means for radiating heat having a least external heat input of an the outer periphery of the means for housing, and said means for radiating heat having a largest radiant heat rate coupled to space of the outer periphery of the means for housing.

2. The space navigation optical instrument according to claim 1, further comprising thermal gradient generating means for generating a thermal gradient between an inside of the housing means of a high temperature and space of a low temperature.

3. The space navigation optical instrument according to claim 1, further comprising heating means for heating the optical part.

4. The space navigation optical instrument according to claim 1, wherein the means for opening and closing is provided with heat radiating means for radiating heat into space.

5. The space navigation optical instrument according to claim 1, wherein said opening and closing means includes at least one door.

6. The space navigation optical instrument of claim 1, wherein the means for radiating heat has a smallest $\alpha/\epsilon$ value on the outer periphery of the housing means, where $\alpha$ is a sunlight absorptivity of the means for radiating heat and $\epsilon$ is an infrared emissivity of the means for radiating heat.

7. A method of removing contaminant for a space navigation optical instrument including a barrel for housing an optical part and a contaminant removing door configured to open and close an inside of the barrel to space and including a heat controller located on an outer periphery of the barrel, said heat controller configured to have a least external heat input of the outer periphery of the barrel and configured to have a largest radiant heat rate coupled to space of the outer periphery of the barrel, the method comprising:
   generating a thermal gradient between the inside of the barrel of a high temperature and space of a low temperature; and
   opening the inside of the barrel to space by opening the contaminant removing door to discharge the contaminant into the space.

8. The method of removing contaminant for a space navigation optical instrument according to claim 7, further comprising:
   heating the optical part to generate a thermal gradient between the optical part of a high temperature and an inside wall of the barrel of a low temperature.

9. The method of removing contaminant for a space navigation optical instrument according to claim 7, wherein the contaminant removing door is of a lowest temperature on an inside wall of the barrel by radiating heat therefrom.

10. The method of removing contaminant for a space navigation optical instrument according to claim 7, wherein the inside of the barrel is opened to space while heating the optical part.

11. The method of removing contaminant for a space navigation optical instrument according to claim 7, wherein the space navigation optical instrument has an observation system side door for guiding observed light emitted from an observation object to the optical part in the barrel in addition to the contaminant removing door, and wherein opening the inside of the barrel to space includes opening the contaminant removing door.

12. The method of removing contaminant for a space navigation optical instrument according to claim 7, wherein the space navigation optical instrument has an observation system side door for guiding observed light emitted from an observation object to the optical part in the barrel in addition to the contaminant removing door, and wherein opening the inside of the barrel to space includes opening the observation system side door.

13. The method of removing contaminant for a space navigation optical instrument of claim 7, wherein the heat controller is further configured to have a smallest $\alpha/\epsilon$ value on the outer periphery of the barrel, where $\alpha$ is a sunlight absorptivity of the heat controller and $\epsilon$ is an infrared emissivity of the heat controller.

14. A method of removing contaminant for a space navigation optical instrument including a barrel for housing an optical part and a contaminant removing door configured to open and close an inside of the barrel to space and including a heat controller configured to have a least external heat input of an outer periphery of the barrel and configured to have a largest radiant heat rate coupled to space of the outer periphery of the barrel , the method comprising:
   generating a thermal gradient between the inside of the barrel of a high temperature and space of a low temperature; and
   opening the inside of the barrel to space by opening the contaminant removing door to discharge the contaminant into the space,
   wherein the space navigation optical instrument has an observation system side door for guiding observed light emitted from an observation object to the optical part in the barrel in addition to the contaminant removing door, and wherein opening the inside of the barrel to space includes opening the observation system side door and the contaminant removing door.

15. The method of removing contaminant for a space navigation optical instrument according to claim 14, wherein the optical instrument is controlled to take an attitude in which the observed light does not impinge when the observation system side door is opened, and wherein opening the inside of the barrel to space includes opening the observation system side door and the contaminant removing door while heating the optical part to discharge the contaminant into space.

16. The method of removing contaminant for a space navigation optical instrument according to claim 14, wherein the optical instrument is controlled to take an attitude in which the observed light does not impinge when the observation system side door is opened, and wherein opening the inside of the barrel to space includes opening the contaminant removing door while heating the optical part to discharge the contaminant into space.

17. The method of removing contaminant for a space navigation optical instrument according to claim 14, wherein the optical instrument is controlled to take an attitude in which the observed light does not impinge when the observation system side door is opened, and wherein opening the inside of the barrel to space includes opening the observation system side door while heating the optical part to discharge the contaminant into space.

18. The method of removing contaminant for a space navigation optical instrument of claim 14, wherein the heat controller is further configured to have a smallest $\alpha/\epsilon$ value on the outer periphery of the housing means, where $\alpha$ is a sunlight absorptivity of the heat controller and $\epsilon$ is an infrared emissivity of the heat controller.

19. A space navigation optical instrument comprising:
a barrel configured to house an optical part; and
a contaminant removing door configured to open and close an inside of the barrel to space and including a heat controller located on an outer periphery of the barrel, said heat controller configured to have a least external heat input of the outer periphery of the barrel and configured to have a largest radiant heat rate coupled to space of the outer periphery of the barrel.

20. The space navigation optical instrument according to claim 19, further comprising a heater configured to heat the optical part.

21. The space navigation optical instrument according to claim 19, wherein the contaminant removing door is configured to radiate heat into space.

22. The space navigation optical instrument of claim 19, wherein the heat controller is further configured to have a smallest $\alpha/\epsilon$ value on the outer periphery of the barrel, where $\alpha$ is a sunlight absorptivity of the heat controller and $\epsilon$ is an infrared emissivity of the heat controller.

23. A space navigation optical instrument comprising: means for housing an optical part; and means for opening and closing an inside of the housing means to space including means for radiating heat, said means for radiating heat having a least external heat input of an outer periphery of the housing means, and said means for radiating heat having a largest radiant heat rate coupled to space during a space navigation, and said opening and closing means includes at least one door configured to cover an aperture in the means for housing wherein said aperture is located out of a direct path between an optical part in the barrel and an observed light emitted from an observation object.

24. The space navigation optical instrument of claim 23, wherein the means for radiating heat has a smallest $\alpha/\epsilon$ value on the outer periphery of the housing means, where $\alpha$ is a sunlight absorptivity of the means for radiating heat and $\epsilon$ is an infrared emissivity of the means for radiating heat.

25. A space navigation optical instrument comprising: means for housing an optical part; and means for opening and closing an inside of the housing means to space including means for radiating heat, said means for radiating heat having a least external heat input of an outer periphery of the housing means, and said means for radiating heat having a largest radiant heat rate coupled to space during a space navigation, and said opening and closing means includes two doors, and one of said two doors is configured to cover an aperture in the means for housing wherein said aperture is located out of a direct path between an optical part in the barrel means for housing and an observed light emitted from an observation object.

26. The space navigation optical instrument of claim 25, wherein the means for radiating heat has a smallest $\alpha/\epsilon$ value on the outer periphery of the housing means, where $\alpha$ is a sunlight absorptivity of the means for radiating heat and $\epsilon$ is an infrared emissivity of the means for radiating heat.

27. A method of removing contaminant for a space navigation optical instrument including a barrel for housing an optical part and a contaminant removing door configured to open and close an inside of the barrel to space and including a heat controller configured to have a least external heat input of an outer periphery of the barrel and configured to have a largest radiant heat rate coupled to space of the outer periphery of the barrel, the method comprising generating a thermal gradient between the inside of the barrel of a high temperature and space of a low temperature; and opening the inside of the barrel to space by opening the contaminant removing door to discharge the contaminant into the space, wherein said contaminant removing door is configured to cover an aperture in the barrel wherein said aperture is located out of a direct path between an optical part in the barrel and an observed light emitted from an observation object.

28. The method of removing contaminant for a space navigation optical instrument of claim 27, wherein the heat controller is further configured to have a smallest $\alpha/\epsilon$ value on the outer periphery of the housing means, where $\alpha$ is a sunlight absorptivity of the heat controller and $\epsilon$ is an infrared emissivity of the heat controller.

29. A space navigation optical instrument comprising: a barrel configured to house an optical part; and a contaminant removing door configured to open and close an inside of the barrel to space and including a heat controller configured to have a least external heat input of an outer periphery of the barrel and configured to have a largest radiant heat rate coupled to space of the outer periphery of the barrel, and said contaminant removing door configured to cover an aperture in the barrel wherein said aperture is located out of a direct path between an optical part in the barrel and an observed light emitted from an observation object.

30. The space navigation optical instrument of claim 29, wherein the heat controller is further configured to have a smallest $\alpha/\epsilon$ value on the outer periphery of the barrel, where $\alpha$ is a sunlight absorptivity of the heat controller and $\epsilon$ is an infrared emissivity of the heat controller.

31. A space navigation optical instrument comprising:
a barrel configured to house an optical part;
a contaminant removing door configured to open and close an inside of the barrel to space and including a heat controller configured to have a least external heat input of an outer periphery of the barrel and configured to have a largest radiant heat rate coupled to space of an outer periphery of the barrel; and an observation system side door for guiding observed light emitted from an observation object to the optical part in the barrel in addition to the contaminant removing door, wherein the contaminant removing door is located out of a direct path between an optical part in the barrel and an observed light emitted from an observation object.

32. The space navigation optical instrument of claim 31, wherein the heat controller is further configured to have a smallest $\alpha/\epsilon$ value on the outer periphery of the barrel, where $\alpha$ is a sunlight absorptivity of the heat controller and $\epsilon$ is an infrared emissivity of the heat controller.

33. A space navigation optical instrument comprising:
a barrel configured to house an optical part;
a contaminant removing door configured to open and close an inside of the barrel to space and including a heat controller located on an outer periphery of the barrel, said heat controller configured to have a least external heat input of an outer periphery of the barrel and configured to have a largest radiant heat rate coupled to space of an outer periphery of the barrel; and
a heat insulating material configured to generate a thermal gradient between an inside of the barrel of a high temperature and space of a low temperature.

34. The space navigation optical instrument of claim 33, wherein the heat controller is further configured to have a smallest $\alpha/\epsilon$ value on the outer periphery of the barrel, where $\alpha$ is a sunlight absorptivity of the heat controller and $\epsilon$ is an infrared emissivity of the heat controller.

* * * * *